United States Patent [19]

Vanlautem

[11] Patent Number: 5,202,106
[45] Date of Patent: Apr. 13, 1993

[54] PURIFICATION OF HYDROCHLORIC ACID WITH FERRIC CHLORIDE PRETREATED ACTIVATED CARBON

[75] Inventor: Noël Vanlautem, Jemeppe-sur-Sambre, Belgium

[73] Assignee: Solvay S.A., Brussels, Belgium

[21] Appl. No.: 886,334

[22] Filed: May 20, 1992

Related U.S. Application Data

[62] Division of Ser. No. 633,766, Dec. 26, 1990, Pat. No. 5,141,913.

[30] Foreign Application Priority Data

Dec. 27, 1989 [BE] Belgium ................................ 8901407

[51] Int. Cl.$^5$ ............................ G01B 7/07; B01D 15/04
[52] U.S. Cl. ..................................... 423/488; 210/660; 210/694; 210/908
[58] Field of Search ................ 423/488; 210/660, 694, 210/908

[56] References Cited

U.S. PATENT DOCUMENTS 3,768,988 10/1973 Meyers ................................. 423/461
3,803,803 4/1974 Raduly et al. ........................... 55/72

FOREIGN PATENT DOCUMENTS 2140539 1/1973 France .
236912 6/1986 German Democratic Rep. .

OTHER PUBLICATIONS

Yu. N. Sychev, "Behavior of Ferric Chloride on Activated Carbon", published in Zhurnal Prikladnoi Khimii, vol. 44, No. 8, pp. 1705-1710 (Aug. 1971).

Primary Examiner—Paul E. Konopka
Attorney, Agent, or Firm—Spencer, Frank & Schneider

[57] ABSTRACT

The present invention relates to a process for the pretreatment of activated carbon, capable of being employed especially for the purification of concentrated solutions of hydrochloric acid.

4 Claims, No Drawings

PURIFICATION OF HYDROCHLORIC ACID WITH FERRIC CHLORIDE PRETREATED ACTIVATED CARBON

This is a division of application Ser. No. 07/633,766 filed Dec. 26, 1990 now U.S. Pat. No. 5,141,913.

The present invention relates to a process for the pretreatment of activated carbon with a view to destroying its reducing properties towards certain metal ions such as ferric ions.

It is known from the document by Yu. N. Sychev, published in Zhurnal Prikladnoi Khimii, vol. 44, No. 8, pp. 1705–1710, August 1971, that activated carbon exhibits reducing properties towards certain metal ions. These properties are seen especially as the formation of ferrous chloride ($FeCl_2$) when gas mixtures containing ferric chloride ($FeCl_3$) are passed through activated carbon.

Such a formation of $FeCl_2$ is not necessarily advantageous and in some industrial processes can be quite undesirable.

Thus, in some cases involving a purification sequence with a first stage of adsorption of "chlorine" residues on activated carbon, that is to say in practice with a view to removing free chlorine and/or residual chlorinated organic impurities, followed by a treatment of adsorption on an anion exchange column to remove the traces of ferric iron which are present in HCl, the formation of ferrous iron ($Fe^{++}$) must be avoided because the anionic columns usually employed for this purpose are inefficient for ferrous salts. Furthermore, the absence of ferrous iron at the outlet of the activated carbon column turns out to be particularly important because of the fact that anionic columns are extremely sensitive to oxidising agents, and this rules out their use for oxidising any ferrous iron which may be present in the mixture after the stage of adsorption on activated carbon which has not been treated according to the process of the present invention.

A process has now been found which, using a simple pretreatment of the activated carbon, allows the latter to be made nonreducing and consequently makes it possible to avoid the formation of ions such as $Fe^{++}$ from mixtures containing iron in $Fe^{+++}$ form, while maintaining the adsorption or absorption capacities of the activated carbon for "chlorine" impurities.

To this end, the present invention relates to a process for the pretreatment of activated carbon, characterised in that, before being used, the activated carbon is treated with a concentrated solution of ferric chloride salt in acidified water with a pH lower than or equal to 3 until the reducing properties of the activated carbon towards ferric ions have disappeared.

The present invention is usually performed with a solution of $FeCl_3$ in an aqueous protonic acid and preferably by starting with an aqueous solution of an inorganic protonic acid. Aqueous solutions of hydrochloric acid are very particularly preferred in this context.

When the operation is performed by starting with an aqueous solution of hydrochloric acid, the work is preferably carried out with a concentration of acid in water which is equal to or higher than 10% by weight. The operation is preferably performed with concentrations of between 20 and 35% by weight. Good results have been obtained by starting with an aqueous solution containing approximately 28% by weight of hydrochloric acid.

The concentration of $FeCl_3$ in the water containing the protonic acid must be chosen so that after the pretreatment operation the activated carbon is no longer a reducing agent for $FeCl_3$. Such a concentration must be deduced experimentally for any type of activated carbon which it is desired to use. In general, nevertheless, it can be stated that, to obtain this result, it is advisable to use solutions in which the $FeCl_3$ concentration is at least equal to and preferably higher than 3 g/l. Good results have been obtained with solutions containing more than 5 g/l of $FeCl_3$ when working with activated carbon sold by Lurgi under the trademarks Hydrafin 30 and Hydrafin CC8/30.

The pretreatment as defined in the present invention may be performed in any manner which allows the activated carbon to be made nonreducing towards $Fe^{+++}$ ions. Thus, the pretreatment may consist especially of passing an acidic aqueous solution containing $FeCl_3$ in the concentrations defined above through a stationary bed of activated carbon. The pretreatment may, however, also be performed under other conditions and may consist especially in suspending activated carbon in a concentrated solution of $FeCl_3$ in acidified water for a period to determined by experiment. The experimental conditions, to be optimised in separate operations, will obviously depend on parameters which can vary and which are not really essential for carrying out the invention, such as, the nature of the activated carbon and pretreatments to which it may already have been subjected, the temperature of applications, the pressure, the physical state of the impregnating mixture, and the like.

To obtain the expected result, the time of contact between the activated carbon and the concentrated $FeCl_3$ solution depends, for its part, especially on the nature of the activated carbon and on the concentration and quantity of $FeCl_3$ solution employed.

The nature of the activated carbon used in the present process is not critical for carrying out the latter but depends on the use for which it is ultimately intended. It is obvious, nevertheless, that its precise nature can affect the concentration and quantity of $FeCl_3$ solution to be used.

Finally, it is obvious that the quantity of $FeCl_3$ solution and consequently the quantity of $FeCl_3$ fixed per gram of activated carbon is an important parameter for performing the process of the invention. However, this is a parameter which it is also appropriate to define as a function of the precise nature of the activated carbon which is used. In the case of the activated carbons Hydrafin 30 and Hydrafin CC8/30 used according to the examples of the present invention, the quantity of $FeCl_3$ necessary to make the activated carbon nonreducing is at least 3 g of $FeCl_3$/50 g of activated carbon, that is to say that the activated carbon must fix 60 g of $FeCl_3$/kg of activated carbon to obtain the particular results observed. This quantity shows practically no change with time and can be determined by any suitable physical or chemical method.

However, the precise quantity of $FeCl_3$ fixed by the activated carbon need not be known in order to carry out the present invention. In fact, in order to know whether the activated carbon has been suitably and sufficiently treated with the concentrated solution of $FeCl_3$, it suffices to take a sample of it, to pass any solution containing $FeCl_3$ through this sample and to measure its absorbance (i.e. the % absorption). In fact, since $FeCl_3$ is coloured and $FeCl_2$ is colourless, the difference in absorbance between the eluate and the virgin solution is the measure of the quantity of $FeCl_2$ formed. Consequently, if the absorbance of the eluate is identical with the absorbance of the virgin solution, there is no further formation of $FeCl_2$ and the pretreatment process is finished.

In addition to its nonreducing property for ferric iron, the activated carbon resulting from the pretreatment according to the present invention retains its adsorptive and absorptive properties towards inorganic and organic chlorinated impurities, and this can be exploited in applications to the purification of compounds resulting from manufacture of organic type or of inorganic type. Thus, for example, the activated carbon resulting from the pretreatment according to the invention can be employed equally well in the purification of any type of hydrochloric acid. This hydrochloric acid may originate from processes employing only inorganic compounds, such as those originating from inorganic chemistry such as, for example, those originating from the chemistry of rare earths. This hydrochloric acid may also originate from processes of treatment of organic compounds, such as organic chlorine compounds.

A process which has yielded good results consists in using the activated carbon resulting from the pretreatment in a complete process of purification of hydrochloric acid solutions containing inorganic impurities such as molecular chlorine and traces of organic impurities such as chloroform, perchloroethylene, hexachlorobutadiene, hexachloroethane and hexachlorobenzene.

The present invention is illustrated by the examples below.

EXAMPLE IR (FOR COMPARISON)

50.00 g of activated carbon sold by Lurgi under the name Hydrafin 30 are introduced into a wash bottle which has an internal diameter of 36 mm (that is as a packing over a height of 75 mm).

An aqueous solution of HCl at a concentration of 28% by weight, containing 2.06 g/l of dissolved $FeCl_3$, is passed continuously through this activated carbon. The flow rate of this solution is adjusted to 820 cm$^3$/h and a sample of the eluate is taken after 115 cm$^3$ have passed through, that is every 7 min.

The absorbance at a wavelength of 480 millimicrons is measured on this sample by colorimetry with a Hach DR3000 colorimeter - program 25. Under these conditions, the starting solution has an absorbance equal to 3.240.

The results of measurements on the various samples are reported in Table I below.

TABLE I

| Sple. No. | abs. |
|---|---|
| 1 | 0.031 |
| 2 | 0.033 |
| 3 | 0.057 |
| 4 | 0.111 |
| 5 | 0.198 |
| 6 | 0.334 |
| 7 | 0.548 |
| 8 | 0.841 |
| 9 | 1.142 |
| 10 | 1.416 |
| 11 | 1.667 |
| 12 | 1.865 |
| 13 | 2.011 |
| 14 | 2.121 |
| 15 | 2.214 |
| 16 | 2.290 |

TABLE I-continued

| Sple. No. | abs. |
|---|---|
| 17 | 2.360 |
| 18 | 2.412 |
| 19 | 2.466 |
| 20 | 2.520 |
| 21 | 2.562 |
| 22 | 2.602 |
| 23 | 2.635 |
| 24 | 2.665 |
| 25 | 2.696 |
| 26 | 2.726 |
| 27 | 2.761 |
| 28 | 2.785 |
| 29 | 2.807 |
| 30 | 2.823 |
| 31 | 1.916 |
| 32 | 2.041 |
| 33 | 2.389 |
| 34 | 2.547 |
| 35 | 2.649 |
| 36 | 2.723 |
| 37 | 2.784 |
| 38 | 2.833 |
| 39 | 2.874 |
| 40 | 2.907 |
| 41 | 2.933 |
| 42 | 2.960 |
| 43 | 2.980 |
| 44 | 3.000 |
| 45 | 3.016 |

Sple. No. = Sample number
abs. = absorbance

The flow rate was interrupted for a period of 16 hours between Samples 30 and 31.

Furthermore, after Sample 45, a test with ortho-phenanthroline confirmed the persistence of a low concentration of $Fe^{++}$.

It can be seen, therefore, that after the passage of $45 \times 115$ cm$^3$, that is 5,175 cm$^3$ of the solution with a concentration of 2.06 g/l of $FeCl_3$, the activated carbon still exhibits reducing properties towards $Fe^{+++}$ ions.

EXAMPLE II (ACCORDING TO THE INVENTION)

Example IR is repeated, but with a concentrated solution of $FeCl_3$ of 7.55 g/l in a solution at a concentration of 28% by weight of HCl in water, whose absorbance is equal to 5.600.

The samples taken under the same conditions as in Example IR exhibit the absorbances reproduced in Table II below.

TABLE II

| Sple. No. | abs. |
|---|---|
| 1 | 0.522 |
| 2 | 2.170 |
| 3 | 4.173 |
| 4 | 5.281 |
| 5 | 5.600 |
| 6 | 5.600 |

Furthermore, a test with ortho-phenanthroline shows that $Fe^{++}$ is no longer present from Sample 6 onwards.

It can be seen, therefore, that after the passage of $6 \times 115$ cm$^3$, that is 690 cm$^3$ of a solution containing a concentration of 7.55 g/l of $FeCl_3$, the activated carbon has lost its reducing properties towards $FeCl_3$, even though there is less $FeCl_3$ in all than in Sample IR with which it has been placed in contact.

EXAMPLE III (ACCORDING TO THE INVENTION)

200 g of activated carbon sold by Lurgi under the name Hydrafin 30 (Test 1) and Hydrafin CC8/30 (Test 2) are immersed for 60 hours in aqueous HCl at a concentration of 28% by weight containing 250 g of $FeCl_3 \cdot 6H_2O/l$ of solution. The activated carbon is allowed to drain and is washed with a solution of aqueous HCl at a concentration of 28% by weight until the iron contents at the entry and at the exit of the washer are equal.

The degree of oxidation of the iron present in the HCl at a concentration of 28% by weight is then measured after it has passed over activated carbon treated or untreated with $FeCl_3$. The results of these measurements are repeated in Table III below.

TABLE III

|  | Untreated activated c. | | Treated activated c. | |
| --- | --- | --- | --- | --- |
|  | HYDRA-FIN 30 | HYDRA-FIN CC8/30 | HYDRA-FIN 30 | HYDRA-FIN CC8/30 |
| $FE^{++}$ | 100% | 100% | not detected | not detected |
| $FE^{+++}$ | traces | traces | 100% | 100% | c. = carbon

From this table it can be deduced again that the reducing capacity of the active carbons towards $Fe^{+++}$ is destroyed by the treatment with the use of a concentrated solution of $FeCl_3$.

Furthermore, the reducing function does not reappear after a prolonged use of the activated carbon, and this is verified after washing with 100 l of HCl at a concentration of 28% by weight in the case of Hydrafin CC8/30 (test 2) and with 1,000 l of HCl at a concentration of 28% by weight in the case of Hydrafin 30 (test 1).

EXAMPLE IV (ACCORDING TO THE INVENTION)

Test 1

The activated carbons resulting from Tests 1 and of Example III are used in order to verify their adsorptive or absorptive capacity for free chlorine. To do this, a solution of HCl at a concentration of 28% by weight, containing 25 mg/l of dissolved chlorine is passed over Hydrafin 30 activated carbon, and a solution of HCl at a concentration of 28% by weight containing 30 mg/l of dissolved chlorine is passed over Hydrafin CC8/30 respectively.

Table IV lists the results observed.

TABLE IV

|  | Hydrafin 30 activated c. | Hydrafin CC8/30 activated c. |
| --- | --- | --- |
| $Cl_2$ before treatment of the activated c. | 25 mg/l | 30 mg/l |
| $Cl_2$ after treatment of the activated c. | not detected | not detected |

Activated c. = activated carbon

Test II

The activated carbons resulting from Tests 1 and 2 of Example III are used for testing their adsorptive or absorptive capacities for chlorinated organic substances. To do this, aqueous solutions of HCl at a concentration of 28% by weight, containing chloroform, perchloroethylene, hexachlorobenzene, hexachlorobutadiene and hexachloroethane in the case of Hydrafin CC8/30, and containing chloroform and perchloroethylene in the case of Hydrafin 30, respectively, are passed through activated carbons.

The results and contents of these various compounds before and after passing over the activated carbons are repeated in Table V below.

TABLE V

| A. Test on Hydrafin CC8/30 activated carbon | | | | |
| --- | --- | --- | --- | --- |
| mg/l | before passing over a. c. | | After passing over a. c. | |
| CLM3 | 12–13 | ave. = 13 | 4.2–5.0 | ave. = 4.6 |
| PER | 5.7–4.1 | ave. = 4.9 | 0.9–<0.1 | ave. = 0.5 |
| HCBu | 0.03–0.05 | ave. = 0.04 | <0.01–<0.01 | ave. = <0.01 |
| HCEa | saturated–4.4 | ave. = >4.4 | <0.01–<0.01 | ave. = <0.01 |
| HCBz | 0.01–0.03 | ave. = 0.02 | <0.01–<0.01 | ave. = <0.01 |

| B. Test on Hydrafin CC8/30 activated carbon | | |
| --- | --- | --- |
| mg/l | before passing over a. c. | After passing over a. c. |
| CLM3 | 4.6 | <0.1 |
| PER | 2.3 | <0.1 | legends:
a. c. = activated carbon
CLM3 = chloroform
PER = perchloroethylene
HCBu = hexachlorobutadiene
HCEa = hexachloroethane
HCBz = hexaclorobenzene
ave. = average

I claim:

1. A process for the purification of a hydrochloric acid solutions, comprising treating a hydrochloric acid solution with pretreated activated carbon prepared by treating said activated carbon with an aqueous concentrated hydrochloric acid solution of ferric chloride salt, in which the concentration of acid in water is equal to or higher than about 10% by weight and the concentration of ferric chloride is at least equal to about 3 g/l.

2. The process according to claim 1, wherein said treatment is performed with said acid solution in which the concentration of acid in water is between about 20 and 35% by weight.

3. The process according to claim 1, wherein the concentration of ferric chloride is at least 5 g/l.

4. The process according to claim 2, wherein said treatment is performed with said acid solution in which the concentration of acid in water is about 28% by weight.

* * * * *